United States Patent
Döhring

(10) Patent No.: US 6,818,286 B2
(45) Date of Patent: Nov. 16, 2004

(54) LAMINATE FLOORING WITH TWO LAYER FOOTFALL NOSE ABSORPTION

(75) Inventor: Dieter Döhring, Lampertswalde (DE)

(73) Assignee: Kronospan Technical Company Limited, Nicosia (CY)

( * ) Notice: Subject to any disclaimer, the term of this patent is extended or adjusted under 35 U.S.C. 154(b) by 0 days.

(21) Appl. No.: 10/130,962

(22) PCT Filed: Jun. 28, 2001

(86) PCT No.: PCT/EP01/07357

§ 371 (c)(1),
(2), (4) Date: Oct. 15, 2002

(87) PCT Pub. No.: WO02/100638

PCT Pub. Date: Dec. 19, 2002

(65) Prior Publication Data

US 2003/0077433 A1 Apr. 24, 2003

(30) Foreign Application Priority Data

May 22, 2001 (DE) .................................... 201 08 668 U

(51) Int. Cl.⁷ ........................... B32B 7/02; B32B 21/08; B32B 27/06; E04F 15/20
(52) U.S. Cl. ........................... 428/215; 428/44; 428/50; 428/213; 428/332; 428/334; 428/511; 428/512; 428/513; 428/514; 428/521; 428/522; 428/523

(58) Field of Search ............................ 428/44, 50, 213, 428/215, 332, 334, 511, 512, 513, 514, 521, 522, 523

(56) References Cited

U.S. PATENT DOCUMENTS

| 4,865,912 A | 9/1989 | Mitsumata .................. 428/285 |
| 5,137,764 A | * 8/1992 | Doyle et al. .................. 428/44 |
| 5,543,194 A | 8/1996 | Rudy .......................... 428/285 |

FOREIGN PATENT DOCUMENTS

| FR | 2351784 | 12/1977 |
| WO | WO 01/09461 | 2/2001 |

* cited by examiner

*Primary Examiner*—D. S. Nakarani
(74) *Attorney, Agent, or Firm*—John W. Renner; Renner, Otto, Boisselle, and Sklar

(57) ABSTRACT

The invention relates to a panel (1) for a floor covering with a layer (2) consisting of a thermoplastic material, which is applied between the underside of the panel (1) and a further layer (3). The further layer consists in particular of a very thin, strong paper impregnated with acrylate.

The invention achieves particularly good footfall noise-absorption.

24 Claims, 2 Drawing Sheets

LAMINATE FLOORING WITH TWO LAYER FOOTFALL NOSE ABSORPTION

The invention relates to a floor covering with a footfall noise-absorbing layer, as frequently used in houses and apartments, and a manufacturing process for the floor covering. A floor covering of this kind is known from the patent specification WO 01/09461.

A rigid floor covering may consist of wood, wood materials and/or synthetic material. Laminate flooring made from individual panels and laid as a floating floor is already a known type of floor covering. An individual panel may consist, for example, of an HDF carrier board with a laminate layer applied to this, which is responsible, amongst other factors, for the appearance of the floor.

When people move around in a room which is fitted with rigid floor panels, the development of noise is considerably greater than in rooms fitted with carpets or resilient floor coverings such as PVC. The development of noise is based on reflections from shock waves, which are introduced into the floor by walking. The amplitude spectrum of the shock waves and/or noise waves depends on the limits room—floor, floor—under-floor, and on the noise absorption of the various layers. The development of noise is particularly large, if a layer of air is trapped between two layers, e.g. between the laminate flooring and the solid floor beneath it.

In order to reduce the development of footfall noise during walking, various matting-like materials such as Noppa-foam, cork, polymer-bonded matting made from recycled rubber and cork, corrugated cardboard or soft wood-fibre fleeces are used as an underlay beneath a rigid floor covering and above the solid floor. However, the noise-absorbing effect achieved in this manner is unsatisfactory. Accordingly, attempts have already been made to glue the named matting-like materials directly on to the reverse of the rigid floor covering, e.g. onto the base of a flooring panel. One disadvantage is that such processes are technology intensive and consequently involve high costs. Overall, the noise reduction is unsatisfactory by comparison with the technological investment.

Accordingly, a noise-absorbing film which is fitted with an adhesive strip is known from the patent specification DE 196 20 987 C1. This noise-absorbing film is supposed to be glued onto the under side of a rigid floor covering, in order to reduce the development of footfall noise on the floor.

The specification DE 43 29 766 A1 discloses a polymer material for footfall noise absorption in flooring.

According to DE 38 35 638 A1, a noise-absorbing material made from expandable polystyrene is used as a noise-absorbing layer for rigid floor coverings.

Firmly attaching a layer made from a thermoplastic material to the floor covering in order to achieve good noise-absorbing properties is known from WO 01/09461 A1.

With the prior art, a disadvantageous, relatively thick, noise-absorbing layer is generally required, in order to achieve the desired effect. Laying thick floor coverings in a building routinely causes problems because laminate flooring must not be thick because of doors and floors in adjoining rooms. Otherwise, steps to adjoining rooms are formed or doors can no longer be opened or closed. Steps are visually undesirable and present a risk of tripping. Doors have to be modified to the altered floor height.

By contrast with the previously named prior art, the object of the present invention is to provide a floor covering which provides very good noise-absorbing properties, so that the noise-absorbing layer can be very thin. The further object of the invention is to create a process with which the floor covering according to the invention can be manufactured in a simple manner.

The object of the invention is achieved in a floor covering with the features of the first claim. A process for the manufacture of the floor covering provides the features of the first dependent claim. Advantageous embodiments are provided in the subordinate claims.

The floor covering according to claim 1 provides a layer made from a thermoplastic material on its underside. The layer made from thermoplastic material is attached firmly to the floor covering. The floor covering consists of wood, wood materials and/or synthetic materials.

A thermoplastic material is a material which becomes soft and fluid when it exceeds a temperature dependent upon the material. In this condition, the material can be formed and can be applied to the underside of the floor covering by coating or rolling and can, therefore, be attached firmly to the floor covering in the sense of the invention.

The material solidifies when it falls below the above-named temperature.

The above-named properties of the thermoplastic material allow it to be attached to the underside of the rigid floor covering by coating or rolling at increased temperatures. Noise waves are transferred through the firm connection directly into the noise-absorbing layer without reflection at the boundary layer. This therefore dispenses with a substantial cause for the lack of noise absorption which is problematic in flooring according to the prior art as described above. The result is a very good absorption of noise.

The underside of the noise-absorbing, thermoplastic layer is attached to another thin layer and, indeed, especially to a layer of paper. The firm connection between this further thin layer and the thermoplastic layer also improves the noise-absorbing properties.

The noise-absorbing layer made from thermoplastic material should ideally be firmly attached to the floor, for example, the solid floor, on which the panels are placed. In practice, this is too expensive. It has now been shown that the noise-absorbing properties of the thermoplastic layer can be further improved by comparison with the prior art named in the introduction, if its underside is not simply placed on a solid floor or similar, but is instead attached at the underside to a further thin layer such as a paper. With a suitably selected layer, that is, with a suitably selected paper, a layer thickness of the noise-absorbing layer of less than 2 mm is adequate to achieve very good noise-absorbing properties.

By comparison with the thermoplastic layer, the other layer does not provide noise-absorbing effects. The other layer may consist entirely or partially of a synthetic resin. It is thinner than the layer made from thermoplastic material.

Manufacturing is simple, because the thermoplastic material merely has to be warmed and applied by coating or rolling. Major technical investment is therefore not required. The thermoplastic material is applied in a pore-free manner, which also promotes the noise-absorbing effect of the thermoplastic layer.

The invention can in principle be used with every floor covering. However, the problem on which the invention is based occurs particularly with rigid floor coverings such as laminate or parquet flooring. A rigid floor covering generally consists of wood, wood materials (HDF or MDF) and/or synthetic material.

A thickness of at least 0.1 mm of the noise-absorbing layer has proved expedient. A thickness of 2 mm of the noise-absorbing layer of thermoplastic material should not been exceeded. Otherwise, the panels will become excessively thick. Moreover, the expenditure on materials is not in an economical proportion to the effect achieved.

In experiments, a thickness of 0.3 mm of the thermoplastic layer has proved advantageous, in order to combine the desired goals of "thin panel" and "very good footfall noise absorption". The prerequisite in this case is the use of a further layer, for example, the use of a particularly well-suited paper.

Of course, the most suitable layer thickness for the thermoplastic layer depends on the material used and will therefore vary in each individual case.

In particular, polymers or copolymers are provided as thermoplastic material. Those polymers or copolymers which provide a pronounced physical relaxation behaviour within the range of room temperature are preferable. Examples of thermoplastic polymers with a pronounced physical relaxation behaviour within the room-temperature range are polyvinyl propionate or polyvinyl acetate. By contrast, for example, polycarbonate, with its high glass transition temperature, is an entirely unsuitable material. In terms of measuring technology, suitable materials provide a clear maximum, for example, when presenting the modulus of torsional shear in dependence upon temperature in the context of dissipation factor tan δ within room-temperature range and/or immediately adjacent temperature ranges. The physical principles including exemplary curves are contained in textbooks of polymer physics, such as, Chemie, Physik und Technologie der Kunststoffe Vol. 6, Kunststoffe 1—Struktur und physikalishes Verhalten der Kunststoffe—, Chapter 4; K. A. Wolf, Springer Verlag 1962. [The Chemistry Physics and Technology of Synthetic Materials—Synthetic Materials 1—Structure and Physical Characteristics of Synthetic Materials].

If the material provides a pronounced physical relaxation behaviour within the room-temperature range, an especially good noise-absorption will be achieved, because kinetic energy will be converted particularly well into thermal energy.

Examples of materials which provide a particularly good relaxation behaviour at room temperature are:

Polyvinyl formals, polyvinyl butyrals, polyvinyl ethers, polyisobutene or copolymers such as terpolymers made from acrylonitrile, butadiene and styrene (ABS), copolymers made from vinyl acetate and vinyl laurate or also polymer mixtures of these polymers also with the addition of typical polymer softeners.

A further, improved, noise-absorbing effect is achieved if polymer or copolymer fillers are added, especially light organic fillers with a density less than 1 g/cm$^3$, such as wood dust. Fillers of this kind may be added up to 90% by mass. The addition of at least 10% by mass is advantageous. In particular, 30% by mass should be added.

In a further advantageous embodiment of the invention, the thermoplastic material is selected in such a manner that it provides adhesive properties. Adhesion is a technical term typically associated with polymers. One example of materials which provide adhesive properties in the sense of the invention is provided by thermoplastic rubbers.

If the material is selected so that it provides adhesive properties, it will adhere as required to the further layer. This avoids air inclusions between the further layer and the thermoplastic layer. Noise can therefore be absorbed in an appropriate manner.

In one embodiment, the noise-absorbing properties are particularly good if a very strong, thin paper is used. For this reason, the weight of the paper is advantageously only 10 to 50 g/m$^2$. In order to achieve a particularly strong paper, it is advantageous to impregnate the paper with a synthetic resin. In particular, the synthetic resin can be introduced into the interior of the paper, for example, by compression. The paper is preferably impregnated with acrylate, which is advantageously contained in the interior of the paper. By preference, the weight of the paper is no more than 30 g/m$^2$.

Using a strong, thin further layer, for example, a strong low-weight paper, has the additional advantage that the overall thickness of the panel is hardly increased.

In particular, the paper used provides the preferred strength in the sense of the invention if no tears appear after the implementation of a standardised water vapour test, in which the paper is subjected to water vapour for a period of 2 hours.

The floor covering in accordance with the claims is manufactured by warming the thermoplastic material in such a manner that it becomes fluid. The warmed material is applied by coating or rolling onto the underside of the floor-covering elements or onto carrier boards for a floor covering of this kind. Alternatively, the warmed thermoplastic material may first be applied to the paper in the desired layer thickness. For example, it may be applied by spraying. Following this, the layer made of thermoplastic material is rolled onto the underside of a panel in such a manner that the paper layer seals the underside. The floor elements or the carrier boards with the attached thermoplastic material are then cooled.

According to the process, the very thin paper is impregnated with a dispersion or mixture containing acrylate, in order to achieve a very strong paper.

The acrylate-containing dispersion or mixture used for impregnation contains water in which the acrylate particles are dispersed. Suitable acrylates are therefore those which are readily dispersible.

In one advantageous embodiment, the acrylate-containing dispersion or mixture is pressed into the paper for the purpose of impregnation. To this end, the paper may, for example, be passed through rollers which press against one another. The acrylate-containing dispersion or mixture is applied continuously to the roller. When the paper leaves the rollers, the dispersion or mixture has been pressed into the paper.

It is essential that the dispersed acrylate and/or mixture is not applied to the paper merely by coating, because in this case, the dispersed acrylate and/or mixture would not penetrate the paper or would penetrate inadequately. Pressing ensures that the dispersion or mixture penetrates the paper and therefore that the paper achieves the desired improved strength.

In one advantageous embodiment of process, the paper is de-aerated before the acrylate-containing dispersion or mixture for impregnation is pressed into the paper. To this end, the paper is soaked, especially on one side, with the acrylate-containing dispersion or mixture. Any air contained in the paper is replaced by the dispersion or the mixture in this manner.

In one embodiment of the invention, a resin-acrylate-mixture or dispersion, especially an amino-resin-acrylate mixture is used for impregnation. With a mixture or dispersion of this kind, paper weights up to a lower limit of approximately 10 g/m$^2$ can be realised. If the mixing ratio is appropriate, papers manufactured in this manner are suitably tear-resistant for use according to the claims. Determining particularly appropriate mixing ratios on the basis of a few experiments can be left to the discretion of a person skilled in art. Optimum values for paper treated in this manner are currently between 25 and 35 g/m$^2$.

In one preferred embodiment of the invention, the acrylate-containing dispersion or mixture is pressed into the de-aerated paper from both sides.

It has been shown that in this case, the paper is filled with the acrylate-containing dispersion or mixture from the centre. Paper impregnated in this manner is particularly well suited for use on the underside of a noise-absorbing layer according to the claims.

Figure 1:
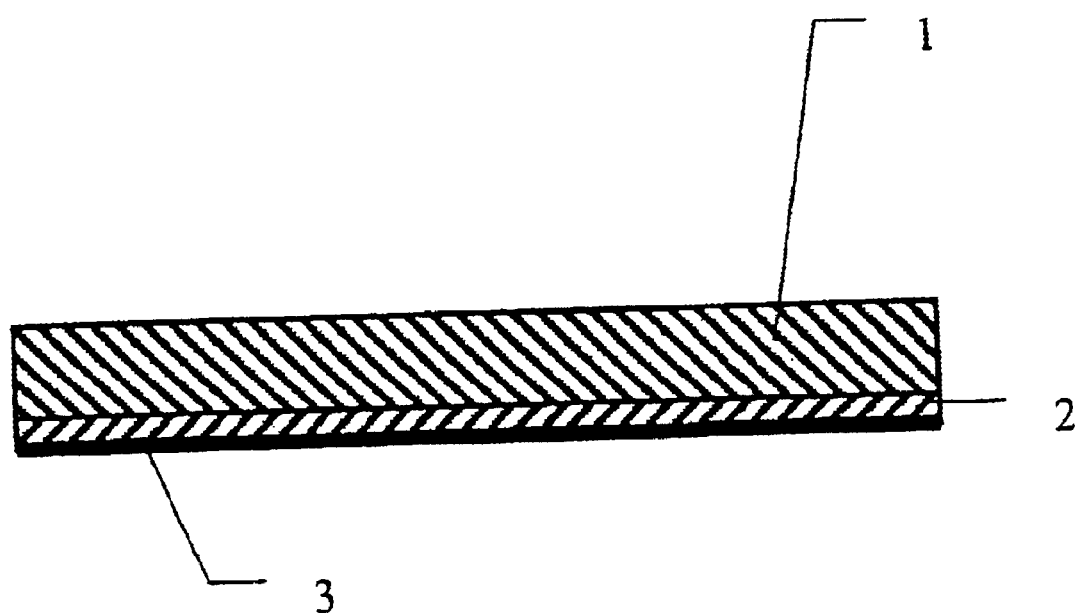
FIG. 1 is a vertical section of a floor panel in accordance with the present invention.

The invention will be explained in greater detail with reference to the following exemplary embodiment. A floor panel 1 is shown in FIG. 1 as a rigid floor covering, which provides the format 1285×185×8 mm. This consists of a 0.8 mm thick high-pressure laminate layer, a 6.4 mm thick HDF carrier board with a density of 870 kg/m³ and a 0.8 mm thick high-pressure laminate counteracting layer. A thermoplastic layer 2 made from a copolymer is applied to the reverse of floor panels of this kind at a temperature of 150° C. using a coating appliance. The copolymer consists of vinyl acetate with a proportion of acrylic-acid ester of 12% by mass. The thickness of the layer applied is 0.3 mm. Following this, the acrylate-containing paper 3 with a substance weight of 30 g/m² is attached firmly to the underside of the thermoplastic layer 2.

Figure 2:
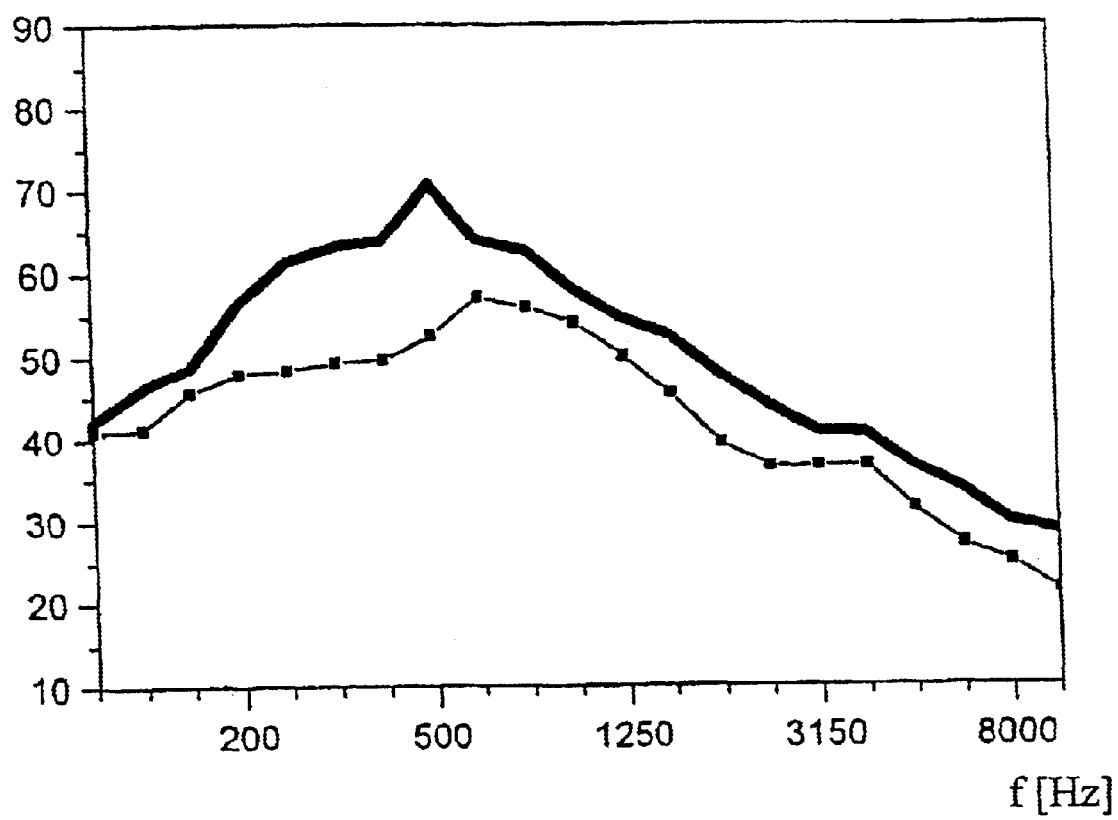
FIG. 2 is a graph of the noise reduction results obtained with a panel in accordance with the invention.

In spite of the significantly thinner thermoplastic layer by comparison with the prior art known from patent specification WO 01/09461, a comparable noise-absorbing effect was achieved. Surprisingly, it was found that a particularly effective noise-absorbing effect can be achieved with the combination according to the invention of "thermoplastic layer and thin carrier". Using the practice-based test method of the IHD Works Standard of the Entwicklungs- und Prüflabor Holztechnologie GmbH, Dresden [eph—Development and Testing Laboratory for Wood Technology; IHD—Institut für Holztechnologie Dresden GmbH], a noise reduction of 10 dB was achieved with a layer thickness of 0.3 mm of a thermoplastic compound with a covering of paper of 30 g/m². This corresponds to a noise-reduction of 50%. The results obtained are shown in FIG. 2. In this context, the measured sound level S in [dB] is plotted against the frequency f in [Hz]. The interrupted line (-.-) shows the results for a laminate floor with a 0.3 mm thick thermoplastic noise-absorbing compound together with the paper covering according to the invention on the underside. The continuous, thick line above this shows the results from a reference measurement.

What is claimed is:

1. A floor covering comprising:
   (a) a panel having a top surface and a bottom surface;
   (b) a thermoplastic material layer formed on the bottom surface of the panel, the thermoplastic material layer having a top surface which is in contact with the bottom surface of the panel an a bottom surface; and
   (c) a further layer formed on the bottom surface of the thermoplastic material layer, the further layer having a top surface which is in contact with the bottom surface of the thermoplastic material layer and a bottom surface, wherein the further layer is formed from paper.

2. The panel according to claim 1, wherein the thermoplastic material layer is applied to the bottom of the panel without the inclusion of air.

3. The panel according to claim 2, wherein the panel has a thickness which is greater than the thickness of the thermoplastic material layer.

4. The panel according to claim 2, wherein the thermoplastic material layer has a thickness which is greater than the thickness of the further layer.

5. The panel according to claim 2, wherein the thermoplastic material layer has a thickness in the range of 0.1 mm to 2 mm.

6. The panel according to claim 2, wherein the further layer is impregnated with a synthetic resin.

7. The panel according to claim 2, wherein the thermoplastic material layer comprises one or more compounds selected from polyvinyl formals, polyvinyl butyrals, polyvinyl ethers, polyisobutene, terpolymers made from acrylonitrile, butadiene and styrene (ABS), copolymers made from vinyl chloride and 2-ethylhexylacrylate, copolymers made from vinyl acetate and vinyl laurate polymers based on tall-oil resin, or mixtures of one or more thereof.

8. The panel according to claim 7, wherein the thermoplastic material layer further comprises at least one polymer softener.

9. The panel according to claim 8, wherein the thermoplastic material layer further comprises at least one filler.

10. The panel according to claim 2, wherein the panel is formed from wood, wood materials, or synthetic materials.

11. The panel according to claim 2, wherein the material used to form the thermoplastic material layer is warmed prior to application to the bottom surface of the panel, and is applied to the bottom surface of the panel by coating or rolling.

12. The panel according to claim 2, wherein the material used to form the thermoplastic material layer is applied to the bottom surface of the panel in a fluid state.

13. The panel according to claim 1, wherein the panel has a thickness which is greater than the thickness of the thermoplastic material layer.

14. The panel according to claim 13, wherein the thermoplastic material layer has a thickness which is greater than the thickness of the further layer.

15. The panel according to claim 14, wherein the thermoplastic material layer has a thickness less than 2 mm but which is greater than the thickness of the further layer.

16. The panel according to claim 1, wherein the thermoplastic material layer has a thickness which is greater than the thickness of the further layer.

17. The panel according to claim 1, wherein the thermoplastic material layer has a thickness in the range of 0.1 mm to 2 mm.

18. The panel according to claim 1, wherein the further layer is impregnated with a synthetic resin.

19. The panel according to claim 1, wherein the thermoplastic material layer comprises one or more compounds selected from polyvinyl formals, polyvinyl butyrals, polyvinyl ethers, polyisobutene, terpolymers made from acrylonitrile, butadiene and styrene (ABS), copolymers made from vinyl chloride and 2-ethylhexylacrylate, copolymers made from vinyl acetate and vinyl laurate polymers based on tall-oil resin, or mixtures of one or more thereof.

20. The panel according to claim 19, wherein the thermoplastic material layer further comprises at least one polymer softener.

21. The panel according to claim 20, wherein the thermoplastic material layer further comprises at least one filler.

22. The panel according to claim 1, wherein the panel is formed from wood, wood materials, or synthetic materials.

23. The panel according to claim 1, wherein the material used to form the thermoplastic material layer is warmed prior to application to the bottom surface of the panel, and is applied to the bottom surface of the panel by coating or rolling.

24. The panel according to claim 1, wherein the material used to form the thermoplastic material layer is applied to the bottom surface of the panel in a fluid state.

* * * * *

UNITED STATES PATENT AND TRADEMARK OFFICE
CERTIFICATE OF CORRECTION

PATENT NO. : 6,818,286 B2 Page 1 of 1
DATED : November 16, 2004
INVENTOR(S) : Dohring, D It is certified that error appears in the above-identified patent and that said Letters Patent is hereby corrected as shown below:

<u>Title page, Item [56] and Column 1, line 2,</u>
Title, replace "NOSE" with -- NOISE --.

Signed and Sealed this

Fifteenth Day of March, 2005

JON W. DUDAS
*Director of the United States Patent and Trademark Office*